Figure 1:
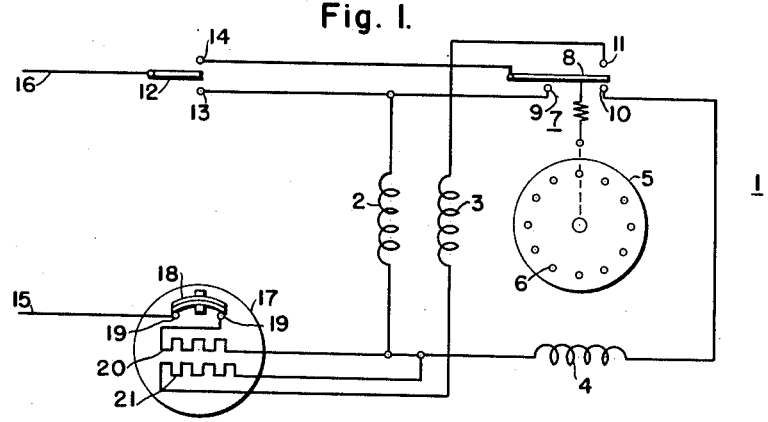

Sept. 21, 1954 C. G. VEINOTT 2,689,933
THERMALLY PROTECTED TWO-SPEED MOTORS
Filed June 26, 1953

WITNESSES:
John E. Hearley
Leon M. Garman

INVENTOR
Cyril G. Veinott.
BY
ATTORNEY

Patented Sept. 21, 1954

2,689,933

UNITED STATES PATENT OFFICE 2,689,933

THERMALLY PROTECTED TWO-SPEED MOTORS

Cyril G. Veinott, Shaker Heights, Ohio, assignor to Westinghouse Electric Corporation, East Pittsburgh, Pa., a corporation of Pennsylvania Application June 26, 1953, Serial No. 364,447

5 Claims. (Cl. 318—221)

The present invention relates to thermal protection of two-speed, single-phase motors and, more particularly, to means for providing adequate protection for both main windings of a two-speed motor of the type which has two main primary windings.

Two-speed operation of single-phase motors is often obtained by providing two main primary windings having different numbers of poles, with a selector switch to connect either winding to the line so as to obtain operation at either one of two speeds. Such motors are frequently provided with only one auxiliary or starting winding, and the speed-responsive starting switch is connected so that the high-speed main winding is always connected to the line with the auxiliary winding for starting, while after operation of the switch, either one of the main windings is connected to the line, as determined by the position of the selector switch.

Two-speed motors of this type have usually been protected against overheating by a conventional thermostatic protective device mounted on the motor. Such protective devices consist of a thermally responsive element, usually a bimetallic disc, arranged to actuate contacts connected in series in the line, and a heater for heating the bimetallic disc. In the conventional connection, the heater and bimetallic disc are connected in series with the motor windings, to carry the line current, and the occurrence of an excessive current, which would cause overheating of the windings, heats the bimetallic disc sufficiently to cause it to open the contacts and disconnect the motor from the line.

When a protective device is connected in this conventional manner to a two-speed motor of the type described above, however, it is extremely difficult, if not impossible, to obtain adequate protection for both main windings. The low-speed winding usually has relatively high resistance and low torque, as compared to the high-speed winding, and in general, its electrical characteristics are considerably different from those of the high-speed winding. The result of this is that if the thermostatic protective device is selected to properly protect the high-speed winding, the low-speed winding is not adequately protected and can overheat dangerously before the protective device will operate. If the protective device is selected to properly protect the low-speed winding, the high-speed winding will be over-protected, and the over-load capacity on the high-speed connection will be unnecessarily limited.

This problem has sometimes been solved by modifying the design of the low-speed winding to reduce its resistance, resulting in a winding which develops more torque than is necessary. This expedient permits better protection against overheating, but it usually results in unnecessarily limiting the design of both windings and materially restricting the performance that can be obtained, in order to obtain the desired thermal protection. It has also been proposed to use two separate heaters for the bimetallic element, with one heater connected in series with each winding. This is undesirable, however, because it requires a large number of special protective devices with different combinations of heaters for use with the many possible different combinations of windings and would, therefore, be quite expensive.

The principal object of the present invention is to provide a two-speed, single-phase motor of the type described above in which adequate thermal protection is provided for both main windings without involving any restrictions on the design of the windings and at relatively low cost.

A more specific object of the invention is to provide a two-speed, single-phase motor of the type described above, in which thermal protection is provided by means of a thermostatic protective device of the usual type selected to provide the desired protection for the high-speed main winding, together with a supplementary heater connected to be energized by the current in the low-speed main winding only, and designed to provide sufficient additional heat when the low-speed winding is connected to the line to provide adequate protection for the low-speed winding.

Figure 2:
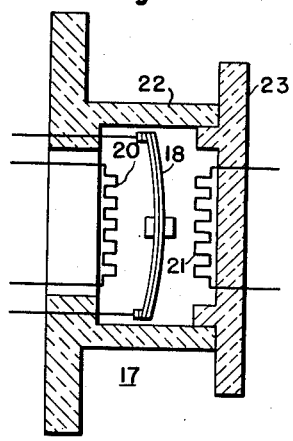

Other objects and advantages of the invention will be apparent from the following detailed description, taken in connection with the accompanying drawing, in which:

Figure 1 is a schematic wiring diagram showing one embodiment of the invention; and Fig. 2 is a somewhat diagrammatic sectional view of a thermostatic protective device.

The invention is shown in the drawing embodied in a two-speed, single-phase motor 1 of the split-phase type. The motor 1 has a high-speed main primary winding 2 and a low-speed main primary winding 3 disposed on the primary member, usually the stator, of the motor. The windings 2 and 3 may be of any suitable or usual type, the winding 2 having a smaller numbers of poles than the winding 3. An auxiliary or starting winding 4 is also provided on the primary member, physically displaced from the main winding 2 by substantially ninety electrical degrees, and designed to cooperate with the winding 2 to provide starting torque. The motor 1 has been shown as a split-phase motor, in which the auxiliary winding 4 has relatively high resistance and low reactance, as compared to the main winding, to provide the necessary phase difference between the currents, but it will be apparent that the invention is also applicable to other types of single-phase motors, such as the capacitor-start motor. The motor 1 also has a secondary or rotor member 5 provided with a secondary winding of any suitable type, shown as a squirrel-cage winding 6.

The motor is provided with a speed-responsive switch 7 of any suitable type, such as a centrifugal switch. The switch 7 is shown as having a pivotally mounted movable member 8 which bridges stationary contacts 9 and 10 when the motor is at rest, as shown in the drawing. When the motor has accelerated to a predetermined speed, the switch arm 8 moves away from the contacts 9 and 10 and makes contact with a stationary running contact 11.

A speed selector switch 12 is also provided which can be placed alternatively on a high-speed contact 13 or a low-speed contact 14 for operation of the motor at either speed. The selector switch may also have an off position, to serve as a line switch as illustrated, or a separate line switch may be provided if desired.

One end of each of the main windings 2 and 3 and one end of the auxiliary winding 4 are connected together and to one side 15 of a single-phase supply line, the other side 16 of the line being connected to the selector switch 12. The free end of the high-speed main winding 2 is connected to the high-speed contact 13 of the selector switch and to the stationary contact 9 of the speed-responsive switch 7. The free end of the low-speed main winding 3 is connected to the stationary contact 11 of the switch 7, and the free end of the auxiliary winding 4 is connected to the contact 10 of the switch 7. The movable switch arm 8 is connected to the low-speed contact 14 of the selector switch 12.

To start the motor 1 for high-speed operation, the selector switch 12 is placed on the high-speed contact 13. It will be seen that this connects the high-speed winding 2 directly across the line, with the auxiliary winding 4 in parallel with the winding 2 through the contacts 9 and 10 and switch arm 8 of the switch 7. The motor will, therefore, start and come up to speed on the high-speed connection. When the motor has accelerated to the switch operating speed, the switch arm 8 will move to the contact 11, interrupting the auxiliary winding circuit through the contacts 9 and 10, so that the auxiliary winding is disconnected and the motor continues to run at high speed on the main winding 2.

If low-speed operation is desired, the motor is started by placing the selector switch 12 on the low-speed contact 14. With the switch 12 in this position, the line 16 is connected to the switch arm 8, and is connected through the contact 9 of the switch 7 to the high-speed main winding 2, and through the contact 10 of the switch 7 to the auxiliary winding 4, so that the high-speed winding and the auxiliary winding are connected to the line, and the motor starts on the high-speed connection as before. When the switch operating speed is reached, the switch arm 8 moves to the contact 11, interrupting the circuits of both the main winding 2 and the auxiliary winding 4, and connecting the low-speed main winding 3 to the line 16 through the contacts 11 and 14, so that the motor continues to run at low speed on the main winding 3.

Two-speed motors of this type have usually been protected against overheating by a conventional thermostatic protective device connected in series with the line to respond to the line current. As previously explained, however, it is not possible to obtain satisfactory protection for both main windings in this manner. In accordance with the present invention, adequate protection for both windings is provided by means of a protective device 17, which may be essentially a standard protective device of the type usually used. The protective device 17 includes a thermally-responsive element, shown as a bimetallic disc 18, which normally bridges stationary contacts 19, and a heater 20 for heating the bimetallic disc 18. The protective device is connected in series with the line 15, as shown, so that the heater 20, and preferably the bimetallic disc, carry the line current, and the device 17 is preferably mounted directly on the motor 1, so as to respond directly to the motor temperature as well as to the current. When the bimetallic disc 18 is heated above a predetermined temperature, it opens the contacts 19, disconnecting the motor from the line.

The heater 20 of the protective device 17 is designed to provide the desired protection for the high-speed main winding 2, and the protective device 17, as so far described, may be a standard protective device selected for protection of the high-speed winding 2 without regard to the low-speed winding. As previously indicated, such a device will not adequately protect the low-speed winding, which usually has higher resistance than the high-speed winding and will, therefore, be overheated by a current which is safe for the high-speed winding. In accordance with the present invention, the low-speed winding 3 is protected by adding a supplementary heater 21 to the protective device 17. The supplementary heater 21 is connected in series with the low-speed winding 3, as shown, to carry only the current of that winding. It will be seen that when the motor is operating on the high-speed winding, no current flows in the supplementary heater 21, and the high-speed winding 2 is protected by the thermostat 17 in the usual manner. When the motor is operating at low speed on the winding 3, however, the current of the winding 3 flows through the supplementary heater 21 and the heat produced by this heater is added to the heat produced by the heater 20, which is in circuit in both connections and carries the line current. The supplementary heater 21 is designed to provide sufficient additional heat to properly protect the low-speed winding, and adequate protection is thus provided for this winding without affecting the protection of the high-speed winding.

The supplementary heater 21 may be of any desired type and may be applied to the protective device 17 in any desired manner. Figure 2 shows one possible way in which the supplementary heater can be applied to a standard protective device which is diagrammatically illustrated. Such devices usually have a molded housing 22 which contains the bimetallic disc 18 and the main heater 20. The supplementary heater 21 may be mounted on an insulating base member 23 which can readily be designed to fit on the housing 22 of a standard protective device as shown in Fig. 2, and in this way, the supplementary heater can readily be applied at low cost. If desired, of course, the supplementary heater 21 could be mounted in the housing 22 itself in any suitable manner, and if this were done, one side of the heater 21 could be connected directly to the main heater 20 within the housing, when the heater 21 is connected in the motor circuit as shown in Fig. 1, so that only three terminals would be required on the protective device.

It should now be apparent that means have been provided for adequately protecting both windings of a two-speed, single-phase motor. This result is obtained by the use of the supplementary heater 21 which provides sufficient additional heat when the motor is running on the low-speed connection to adequately protect the low-speed winding, while the main heater 20 provides protection for the high-speed winding and also provides most of the heat needed on the low-speed connection. The supplementary heater, therefore, is required to supply only the relatively small amount of additional heat required to adequately protect the low-speed winding.

This arrangement has a number of advantages as compared with the expedients which have previously been proposed. Each of the main windings 2 and 3 can be individually designed for the desired performance without regard to the design of the other winding, and without requiring any design compromises to make reasonably satisfactory protection possible, as has previously been necessary, since the arrangement described makes it possible to protect each winding independently of the other. Complete protection can, therefore, be obtained without affecting the performance obtainable, and without limiting the overload capacity in the high-speed connection or sacrificing the desired degree of protection for the low-speed winding.

The cost of obtaining protection in this way is relatively low, since standard protective devices can be used, and only a small number of different designs of supplementary heaters are needed to provide protection for a wide range of different motor ratings and winding combinations. This is a great advantage over the use of two separate heaters used independently with the respective windings, because a large number of different combinations of heaters would be required, and these special designs of protective devices would not be usable in other motors, so that a large stock of special protective devices would have to be maintained by the motor manufacturer. Thus, the protective system of the present invention is much more satisfactory and less expensive because the main element of the protective device is a standard device which is used in large quantities for many other applications. To apply it to any particular two-speed motor, it is only necessary to add one of a relatively few designs of inexpensive supplementary heaters. Thus, the cost is low and the desired protection is obtained in a simple and inexpensive manner.

A particular embodiment of the invention has been shown and described for the purpose of illustration, but it will be apparent that various modifications might be made within the scope of the invention, and it is to be understood that the invention is not limited to the specific arrangement shown, but in its broadest aspects it includes all equivalent embodiments and modifications.

I claim as my invention:

1. A single-phase induction motor having relatively rotatable primary and secondary members, first and second main primary windings on the primary member, said main primary windings having different numbers of poles, an auxiliary primary winding physically displaced from the main windings on the primary member, switch means for connecting the first main primary winding and the auxiliary winding to a single-phase line for starting and for thereafter connecting either one of the main windings to the line for running, and a protective device for the motor including contact means connected in series with the line, thermally responsive means adapted to actuate the contact means to open position when heated above a predetermined temperature, a first heater for said thermally-responsive means energized by the line current, and a second heater for the thermally-responsive means energized by the current in the second main primary winding only.

2. A single-phase induction motor having relatively rotatable primary and secondary members, first and second main primary windings on the primary member, said main primary windings having different numbers of poles, an auxiliary primary winding physically displaced from the main windings on the primary member, switch means for connecting the first main primary winding and the auxiliary winding to a single-phase line for starting and for thereafter connecting either one of the main windings to the line for running, and a protective device for the motor including contact means connected in series with the line, thermally-responsive means adapted to actuate the contact means to open position when heated above a predetermined temperature, a first heater for the thermally-responsive means connected to carry the line current, and a second heater for the thermally-responsive means connected to carry the current of the second main primary winding only.

3. A single-phase induction motor having relatively rotatable primary and secondary members, first and second main primary windings on the primary member, said main primary windings having different numbers of poles, and auxiliary primary winding physically displaced from the main windings on the primary member, switch means for connecting the first main primary winding and the auxiliary winding to a single-phase line for starting and for thereafter connecting either one of the main windings to the line for running, and a protective device for the motor including contact means connected in series with the line, thermally-responsive means adapted to actuate the contact means to open position when heated above a predetermined temperature, a first heater for the thermally-responsive means connected in series with both main primary windings, and a second heater for the thermally-responsive means connected in series with the second main primary winding only.

4. A single-phase induction motor having relatively rotatable primary and secondary members, first and second main primary windings on the primary member, said main primary windings having different number of poles, an auxiliary primary winding physically displaced from the main windings on the primary member, switch means for connecting the first main primary windings and the auxiliary winding to a single-phase line for starting and for thereafter connecting either one of the main windings to the line for running, and a protective device for the motor, said protective device comprising a thermally-responsive element, contact means actuated by the thermally-responsive element, said contact means being connected in series in the line, a main heater for the thermally-responsive element, means for connecting the main heater to be energized by the line current, a supplementary heater for the thermally-responsive element, and means for connecting the supplementary heater to be energized by the current in the second main primary winding only.

5. A single-phase induction motor having relatively rotatable primary and secondary members, first and second main primary windings on the primary member, said main primary windings having different numbers of poles, an auxiliary primary winding physically displaced from the main windings on the primary member, switch means for connecting the first main primary winding and the auxiliary winding to a single-phase line for starting and for thereafter connecting either one of the main windings to the line for running, and a protective device for the motor, said protective device comprising a thermally-responsive element, contact means actuated by the thermally-responsive element, said contact means being connected in series in the line, a main heater for the thermally-responsive element, means for connecting the main heater in series with both main primary windings, a supplementary heater for the thermally-responsive element, and means for connecting the supplementary heater in series with the second main primary winding only.

No references cited.